United States Patent
Mukherjee et al.

(10) Patent No.: US 10,582,212 B2
(45) Date of Patent: Mar. 3, 2020

(54) WARPED REFERENCE MOTION VECTORS FOR VIDEO COMPRESSION

(71) Applicant: GOOGLE LLC, Mountain View, CA (US)

(72) Inventors: Debargha Mukherjee, Cupertino, CA (US); Yunqing Wang, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/846,295

(22) Filed: Dec. 19, 2017

(65) Prior Publication Data
US 2019/0110063 A1  Apr. 11, 2019

Related U.S. Application Data

(60) Provisional application No. 62/569,530, filed on Oct. 7, 2017.

(51) Int. Cl.
*H04N 19/176* (2014.01)
*H04N 19/159* (2014.01)
(Continued)

(52) U.S. Cl.
CPC ......... *H04N 19/517* (2014.11); *H04N 19/176* (2014.11); *H04N 19/54* (2014.11);
(Continued)

(58) Field of Classification Search
CPC .... H04N 19/52; H04N 19/105; H04N 19/159; H04N 19/176; H04N 19/513; H04N 19/567
See application file for complete search history.

(56) References Cited

U.S. PATENT DOCUMENTS 9,438,910 B1 * 9/2016 Han ................... H04N 19/105
2002/0034250 A1 * 3/2002 Yoo ................... H04N 19/537
375/240.16
(Continued)

FOREIGN PATENT DOCUMENTS

WO  2017/118411 A1  7/2017
WO  2017/148345 A1  9/2017

OTHER PUBLICATIONS

Bankoski, et al., "Technical Overview of VP8, An Open Source Video Codec for the Web", Jul. 11, 2011, 6 pp.
(Continued)

*Primary Examiner* — Alison Slater
(74) *Attorney, Agent, or Firm* — Young Basile Hanlon & MacFarlane, P.C.

(57) ABSTRACT

A motion vector candidate list is generated that can be used to encode or decode a motion vector used to predict the current block. A motion mode and motion information for a source block is determined. A motion vector used to predict the source block is added to the list responsive to determining that the motion mode for the source block is a translational motion mode and that a reference frame for the source block matches the reference frame for the current block. A warped reference motion vector is instead added to the list responsive to determining that the motion mode for the source block is a warped motion mode and that the reference frame for the source block matches the reference frame for the current block. A reference motion vector from the list is selected for encoding or decoding the current block motion vector.

20 Claims, 7 Drawing Sheets

(51) Int. Cl.
H04N 19/182 (2014.01)
H04N 19/184 (2014.01)
H04N 19/52 (2014.01)
H04N 19/517 (2014.01)
H04N 19/543 (2014.01)
H04N 19/54 (2014.01)
H04N 19/109 (2014.01)

(52) U.S. Cl.
CPC ......... *H04N 19/543* (2014.11); *H04N 19/109* (2014.11); *H04N 19/159* (2014.11); *H04N 19/182* (2014.11)

(56) References Cited

U.S. PATENT DOCUMENTS

| | | | | |
|---|---|---|---|---|
| 2014/0286433 | A1* | 9/2014 | He | H04N 19/56 375/240.16 |
| 2017/0013279 | A1* | 1/2017 | Puri | H04N 19/176 |
| 2017/0332095 | A1* | 11/2017 | Zou | H04N 19/124 |
| 2018/0098066 | A1* | 4/2018 | Lee | H04N 19/117 |
| 2018/0098087 | A1* | 4/2018 | Li | H04N 19/176 |
| 2018/0098089 | A1* | 4/2018 | Chen | H04N 19/521 |
| 2019/0028731 | A1* | 1/2019 | Chuang | H04N 19/105 |
| 2019/0058896 | A1* | 2/2019 | Huang | H04N 19/105 |
| 2019/0110063 | A1* | 4/2019 | Mukherjee | H04N 19/176 |

OTHER PUBLICATIONS

Series H: Audiovisual and Multimedia Systems, Coding of moving video: Implementors Guide for H.264: Advanced video coding for generic audiovisual services, International Telecommunication Union, Jul. 30, 2010, 15 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
International Search Report and Written Opinion in PCT/US2018/041073, dated Sep. 19, 2018, 16 pgs.
Yi-Wen Chen et al., "Improved Affine Motion Vector Coding", Joint Video Exploration Team (JVET) of ITU-T SG 16 WP 3 and ISO/IEC JTC 1/SC 29/WG 11, 4th Meeting, Chengdu, CN, Oct. 15-21, 2016, No. JVET-D0128-v4 (Oct. 20, 2016, pp. 1-4.

Gary J. Sullivan et al., "Overview of the High Efficiency Video Coding (HEVC) Standard", IEEE Transactions on Circuits and Systems for Video Technology, vol. 22, No. 12, Dec. 1, 2012, pp. 1649-1668.
Bankoski, et al., "Technical Overview of VP8, An Open Source Video Codec for the Web", Jul. 11, 2011, 6.
Bankoski et al, "VP8 Data Format and Decoding Guide", Independent Submission RFC 6389, Nov. 2011, 305 p. 14.
Bankoski et al, "VP8 Data Format and Decoding Guide draft-bankoski-vp8-bitstream-02", Network Working Group, Internet-Draft, May 18, 2011, 288 p. 122.
Series H: Audiovisual and Multimedia Systems, Coding of moving video: Implementors Guide for H.264: Advanced video coding for generic audiovisual services, International Telecommunication Union, Jul. 30, 2010, 15.
"Introduction to Video Coding Part 1: Transform Coding", Mozilla, Mar. 2012, 171 pp. 60, 116, 140, 145, 162, 170.
"Overview VP7 Data Format and Decoder", Version 1.5, On2 Technologies, Inc., Mar. 28, 2005, 65.
Series H: Audiovisual and Multimedia Systems, Infrastructure of audiovisual services—Coding of moving video, Advanced video coding for generic audiovisual services, International Telecommunication Union, Version 11, Mar. 2009. 670 pp. 54, 175-176, 183-185, 455, 475, 495-501, 526-529.
Series H: Audiovisual and Multimedia Systems, Infrastructure of audiovisual services—Coding of moving video, Advanced video coding for generic audiovisual services, International Telecommunication Union, Version 12, Mar. 2010, 676 pp. 54, 173, 181-182, 458, 479, 499-505, 530-533.
Series H: Audiovisual and Multimedia Systems, Infrastructure of audiovisual services—Coding of moving video, Amendment 2: New profiles for professional applications, International Telecommunication Union, Apr. 2007, 75.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp. 55, 169, 177-178, 445, 462-467, 492-495.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16.
Series H: Audiovisual and Multimedia Systems, Infrastructure of audiovisual services—Coding of moving video, Advanced video coding for generic audiovisual services, Version 1, International Telecommunication Union, May 2003, 282 pp. 41, 131, 138-140.
Series H: Audiovisual and Multimedia Systems, Infrastructure of audiovisual services—Coding of moving video, Advanced video coding for generic audiovisual services, Version 3, International Telecommunication Union, Mar. 2005, 343 pp. 48, 154-155, 162-163.
"VP6 Bitstream and Decoder Specification", Version 1.02, On2 Technologies, Inc., Aug. 17, 2006, 88.
"VP6 Bitstream and Decoder Specification", Version 1.03, On2 Technologies, Inc., Oct. 29, 2007, 95.
"VP8 Data Format and Decoding Guide, WebM Project", Google On2, Dec. 1, 2010, 103 pp. 13-14, 86.

* cited by examiner

WARPED REFERENCE MOTION VECTORS FOR VIDEO COMPRESSION

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

One technique for compression uses a reference frame to generate a prediction block corresponding to a current block to be encoded. Differences between the prediction block and the current block can be encoded, instead of the values of the current block themselves, to reduce the amount of data encoded.

SUMMARY

This disclosure relates generally to encoding and decoding video data and more particularly relates to generating a warped reference motion vector for video compression.

This disclosure describes encoding and decoding methods and apparatuses. A method according to an implementation of the disclosure includes determining a reference frame for a current block, and, for each source block, determining a motion mode and a reference frame for the source block, responsive to determining that the motion mode for the source block is a translational motion mode and that the reference frame for the source block matches the reference frame for the current block, adding a motion vector used to predict the source block to a reference motion vector candidate list, and responsive to determining that the motion mode for the source block is the warped motion mode and that the reference frame for the source block matches the reference frame for the current block, generating a warped reference motion vector for the current block, and adding the warped reference motion vector to the reference motion vector candidate list. The method also includes using a reference motion vector from the reference motion vector candidate list to encode or decode a motion vector used to predict the current block.

An apparatus according to an implementation of the disclosure includes a non-transitory storage medium or memory and a processor. The medium includes instructions executable by the processor to carry out a method including determining a reference frame of a current block, and, for one or more source blocks for the current block, determining a motion mode and a reference frame for the source block, responsive to determining that the motion mode for the source block is a translational motion mode and that the reference frame for the source block matches the reference frame for the current block, adding a motion vector used to predict the source block to a reference motion vector candidate list, and responsive to determining that the motion mode for the source block is the warped motion mode and that the reference frame for the source block matches the reference frame for the current block, generating a warped reference motion vector for the current block, and adding the warped reference motion vector to the reference motion vector candidate list. The method also includes using a reference motion vector of the reference motion vector candidate list to encode or decode a motion vector used to predict the current block.

Another apparatus according to an implementation of the disclosure also includes a non-transitory storage medium or memory and a processor. The medium includes instructions executable by the processor to carry out a method including determining a reference frame for encoding a current block. The method also includes, for a previously-coded block adjacent to the current block, determining the motion mode of the previously-coded block, the motion mode comprising one of a translational motion mode and a warped motion mode, determining a reference frame used to encode the previously-coded block, comparing the motion mode of the previously-coded block to the warped motion mode to obtain a first comparison result, comparing the reference frame for encoding the current block to the reference frame used to encode the previously-coded block to obtain a second comparison result, and responsive to the first comparison result indicating that the motion mode of the previously-coded block is the warped motion mode, and the second comparison result indicating that the reference frame for encoding the current block is the reference frame used to encode the previously-coded block, calculating a warped reference motion vector for the current frame by applying a warped motion model used to predict the previously-coded block to pixels of the current block, and adding the warped reference motion vector to a reference motion vector candidate list. The method also includes using a reference motion vector from the reference motion vector candidate list to encode or decode a motion vector used to predict the current block.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings described below wherein like reference numerals refer to like parts throughout the several views unless otherwise noted.

DETAILED DESCRIPTION

Figure 1:
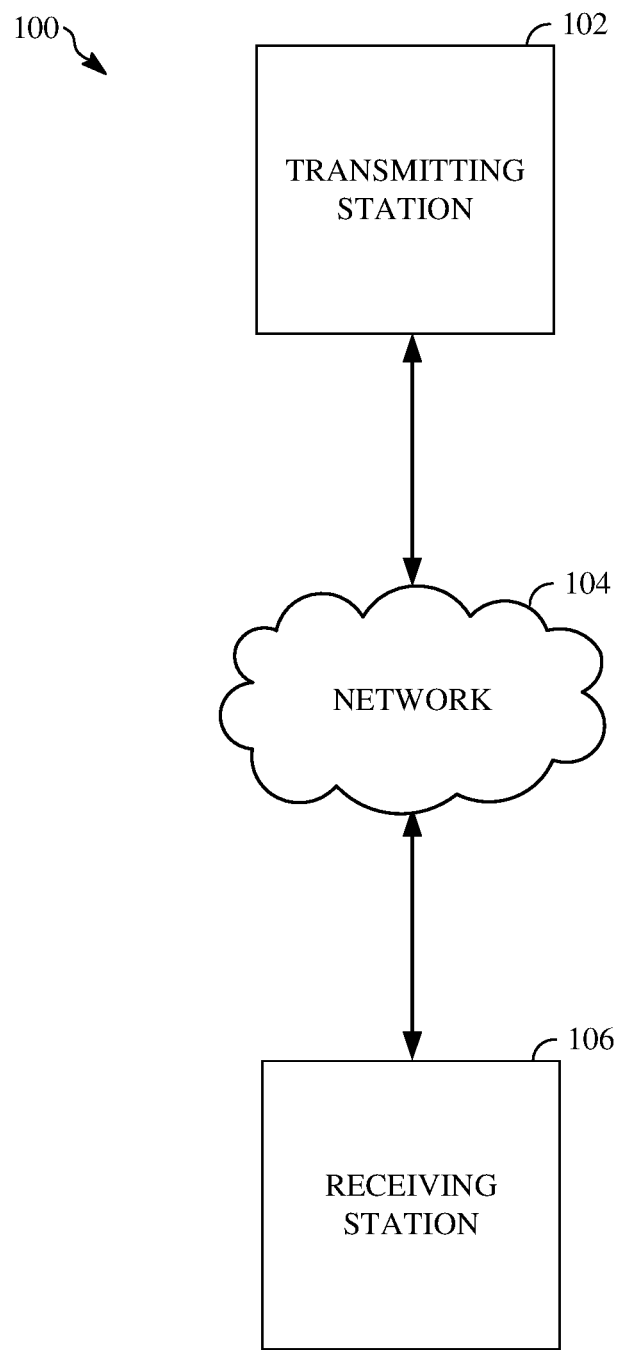
FIG. 1 is a schematic of a video encoding and decoding system.

A video stream can be compressed by a variety of techniques to reduce bandwidth required transmit or store the video stream. A video stream can be encoded into a bitstream, which involves compression, which is then transmitted to a decoder that can decode or decompress the video stream to prepare it for viewing or further processing.

Compression of the video stream often exploits spatial and temporal correlation of video signals through spatial and/or motion-compensated prediction. Motion-compensated prediction may also be referred to as inter-prediction. Inter-prediction uses one or more motion vectors to generate a block (also called a prediction block) that resembles a current block to be encoded using previously encoded and decoded pixels. By encoding the motion vector(s), and the difference between the two blocks, a decoder receiving the encoded signal can re-create the current block.

Each motion vector used to generate a prediction block in the inter-prediction process refers to a frame, i.e., a reference frame, other than a current frame. Reference frames can be located before or after the current frame in the sequence of the video stream, and may be frames that are reconstructed before being used as a reference frame. As used herein, a forward reference frame is a frame used for forward prediction relative to the sequence, while a backward reference frame is a frame used for backward prediction relative to the sequence. One or more forward and/or backward reference frames can be used to encode or decode a block. The efficacy of a reference frame when used to encode or decode a block within a current frame can be measured based on a resulting signal-to-noise ratio or other measure of rate-distortion.

The motion vector(s) for a block in motion-compensated prediction may be written into the encoded bitstream, taking a large portion of the total bitrate. To lower the rate cost of coding the motion vectors, a motion vector may be coded differentially. Namely, a motion vector is selected as a reference motion vector, and only a difference between the motion vector and the reference motion vector (also called the motion vector difference herein) is coded into the bitstream. The reference motion vector may be a motion vector of one of the neighboring blocks, for example. An accurate reference motion vector for a block improves coding efficiency.

There may exist more than one inter-prediction mode. For example, one available inter-prediction mode represents that the motion vector of the block is 0. Thus, there is no rate cost for encoding a motion vector. This is referred to as a ZEROMV mode herein. Another inter-prediction mode may represent that the motion vector of the block is the reference motion vector. In this case, also, there is no rate cost for encoding a motion vector. This is referred to as a REFMV mode herein. When the motion vector for the block is not zero, and is different from the reference motion vector, the motion vector may be encoded using the reference motion vector. In this mode, encoding the motion vector difference generates a rate cost. This mode is referred to as a NEWMV mode herein.

One process for finding a reference motion vector for a current block in a current frame includes collecting motion vectors from neighboring or adjacent blocks to the current block (e.g., in the scan order) and the collocated block(s) to the current block in a previous frame, and storing them in a list of motion vector candidates. The neighboring or adjacent blocks and the collocated block(s) may be referred to as source or reference blocks herein. Any number of ranking algorithms may be applied to the list to rank the motion vector candidates, and the reference motion vector for the current block may be selected based on the resulting ranking. For example, the motion vector candidate with the highest ranking score may be selected as the reference motion vector for the current block. In some cases, a motion vector candidate may be ranked higher if the motion vector candidate is a dominant motion vector in the surrounding area of the current block, which means that motion vector candidate may be a better representative of the local motion field. A dominant motion vector may be one that is used by more source blocks, or more pixels of the source blocks, than other motion vectors. The size of a source block may be used to weight the motion vector for the ranking. The larger the source block is, the more dominant its motion vector is.

If the reference motion vector is close to the motion vector of the current block (e.g., the motion vector as determined from a motion search), the REFMV mode may be chosen such that the reference motion vector is used directly without generating any motion vector rate cost. The determination of whether the reference motion vector is close enough to the motion vector of the current block to be used in place of the determined motion vector may be made by calculating an error, such as a rate-distortion error. If the REFMV mode results in a smaller rate-distortion error than any other modes, the REFMV mode is selected such that no motion vector rate cost results.

If instead the reference motion vector does not generate a good prediction for the current block (that is, reference motion vector is not close to the motion vector of the current block), then the NEWMV mode may have a lower rate-distortion error and be chosen. The new motion vector may be encoded by calculating a motion vector difference using the reference motion vector. Then, the motion vector difference is transmitted in the encoded bitstream to a decoder. Even where the reference motion vector is not close enough to the motion vector of the current block to be used in place of the current block, a relatively accurate reference motion vector can lower the bit rate needed for transmitting the motion vector difference.

Not all motion across images (and hence between video frames) is translational. As a result, a translational motion mode is not capable of precisely describing more complicated motion, such as rotation, zooming, shear, etc. To overcome this deficiency, various warped motion models have been developed to implement a warped motion mode. One example of a warped motion model is an affine transformation that describes the inter-block motion. One technique to produce an affine transformation is found in U.S. Pat. No. 9,438,910, and other techniques are possible. U.S. Pat. No. 9,438,910 is incorporated herein in its entirety by reference.

For a block, the decision of whether to use a translational motion mode or warped motion mode may be made based on which mode results in the lowest rate-distortion error, where the rate-distortion error for each mode represents the rate cost of encoding the block using the mode as compared to the distortion cost that results from the compression using the mode in a similar manner as to how the motion vector coding modes are compared. For example, if a block is encoded using a warped motion mode, then the parameters defined by the warped motion mode are used to generate a warped prediction block. When the warped motion mode is an affine transformation, then a set of affine parameters are computed and used to generate the warped prediction block. For a block with the warped motion mode, it may be assumed in some implementations that the motion vector of the block is the motion vector of its center point.

When the motion of a block is non-translational, that is, it is predicted using a warped reference mode, its motion vector is likely to be different from those of its source motion vectors. Because the reference motion vector is one of these motion vectors, the reference motion vector is also likely to be different from the block's motion vector. The differences tend to be relatively large, so an encoder mostly chooses the NEWMV mode to encode the motion vector of a block under such circumstances. The NEWMV mode is the most expensive technique to encode a motion vector, as described above.

Accordingly, generating more accurate reference motion vectors for a block is desired. This lowers the bitrate cost of encoding motion vectors. Details of generating reference motion vectors from warped motion source blocks, also called warped reference motion vectors herein, are described herein with initial reference to a system in which the teachings herein can be implemented.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
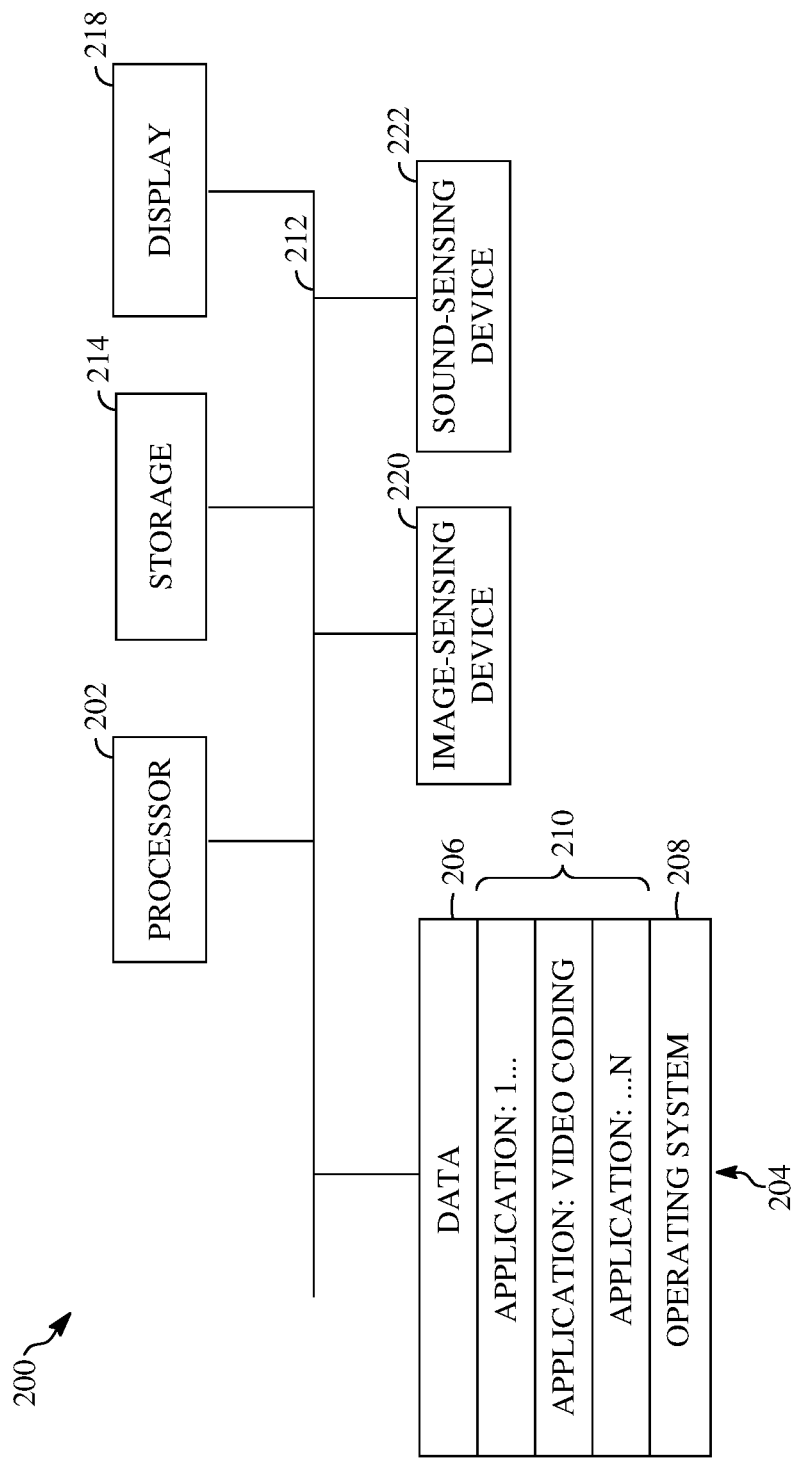
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having a non-transitory storage medium or memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hypertext Transfer Protocol (HTTP) based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with one processor as shown, e.g., the CPU 202, advantages in speed and efficiency can be achieved using more than one processor.

A memory 204 in computing device 200 can be a read only memory (ROM) device or a random access memory (RAM) device in an implementation. Any other suitable type of storage device or non-transitory storage medium can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. Computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into one unit, other configurations can be utilized. The operations of the CPU 202 can be distributed across multiple machines (wherein individual machines can have one or more of processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
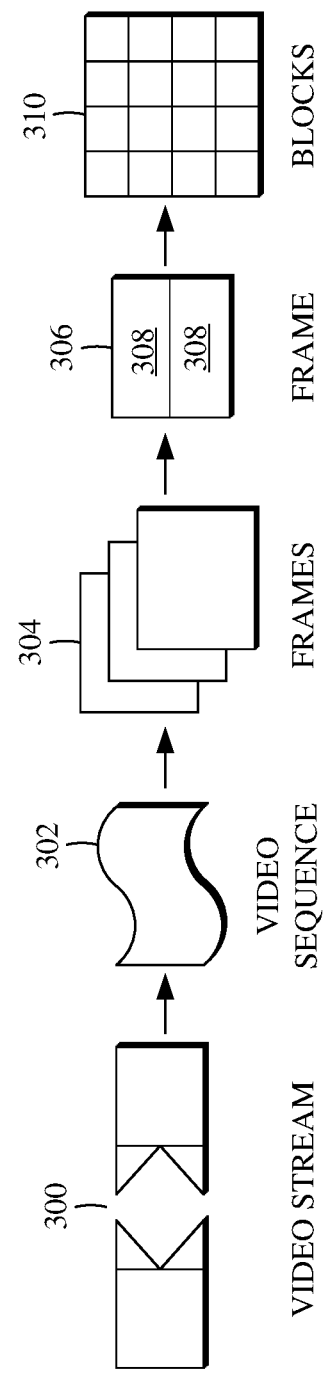
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
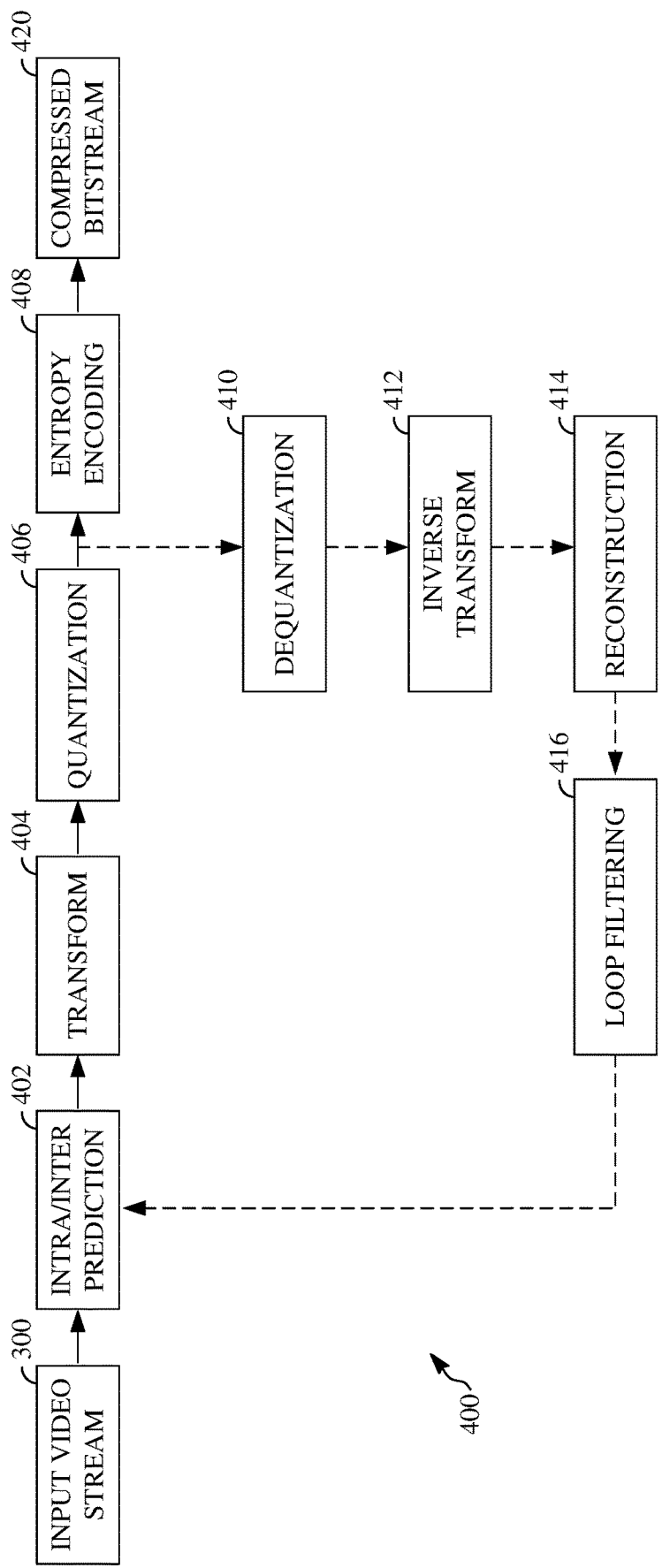
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described in FIG. 4. The encoder 400 can also be implemented as specialized hardware included in, for example, the transmitting station 102. The encoder 400 may be a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. The entropy-encoded coefficients, together with other information used to decode the block, which may include for example the type of prediction used, transform type, motion vectors and quantizer value, are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path in FIG. 4 (shown by the dotted connection lines) can be used to ensure that the encoder 400 and a decoder 500 (described below) use the same reference frames to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder can quantize the residual signal directly without the transform stage 404 for certain blocks or frames. In another implementation, an encoder can have the quantization stage 406 and the dequantization stage 410 combined in a common stage.

Figure 5:
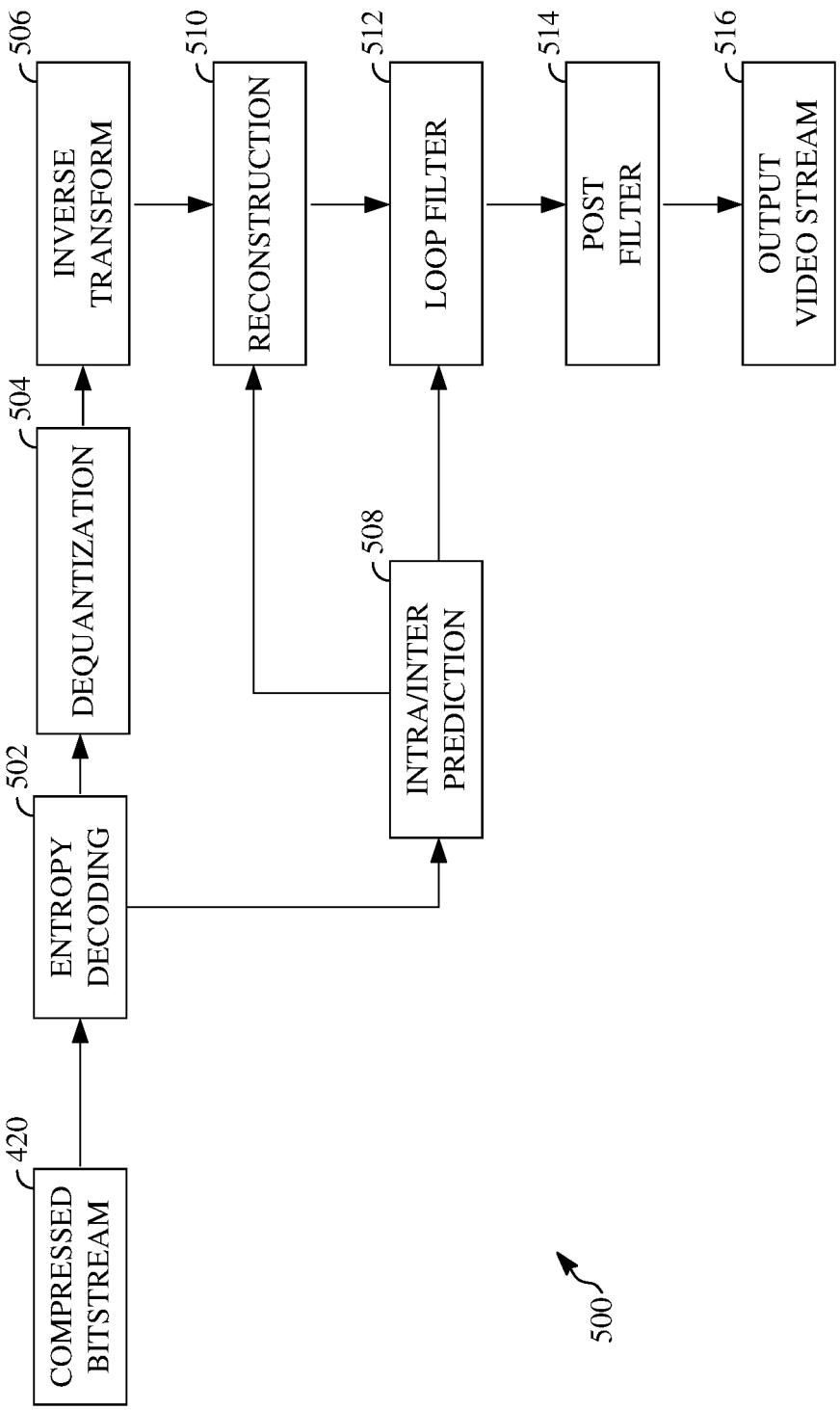
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described herein. The decoder 500 can also be implemented in hardware included in, for example, the transmitting station 102 or the receiving station 106. The decoder 500 may be a hardware decoder.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512 and a post filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts.

Other filtering can be applied to the reconstructed block. In this example, the post filtering stage 514 can be a deblocking filter that is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. For example, the decoder 500 can produce the output video stream 516 without the post filtering stage 514.

Figure 6:
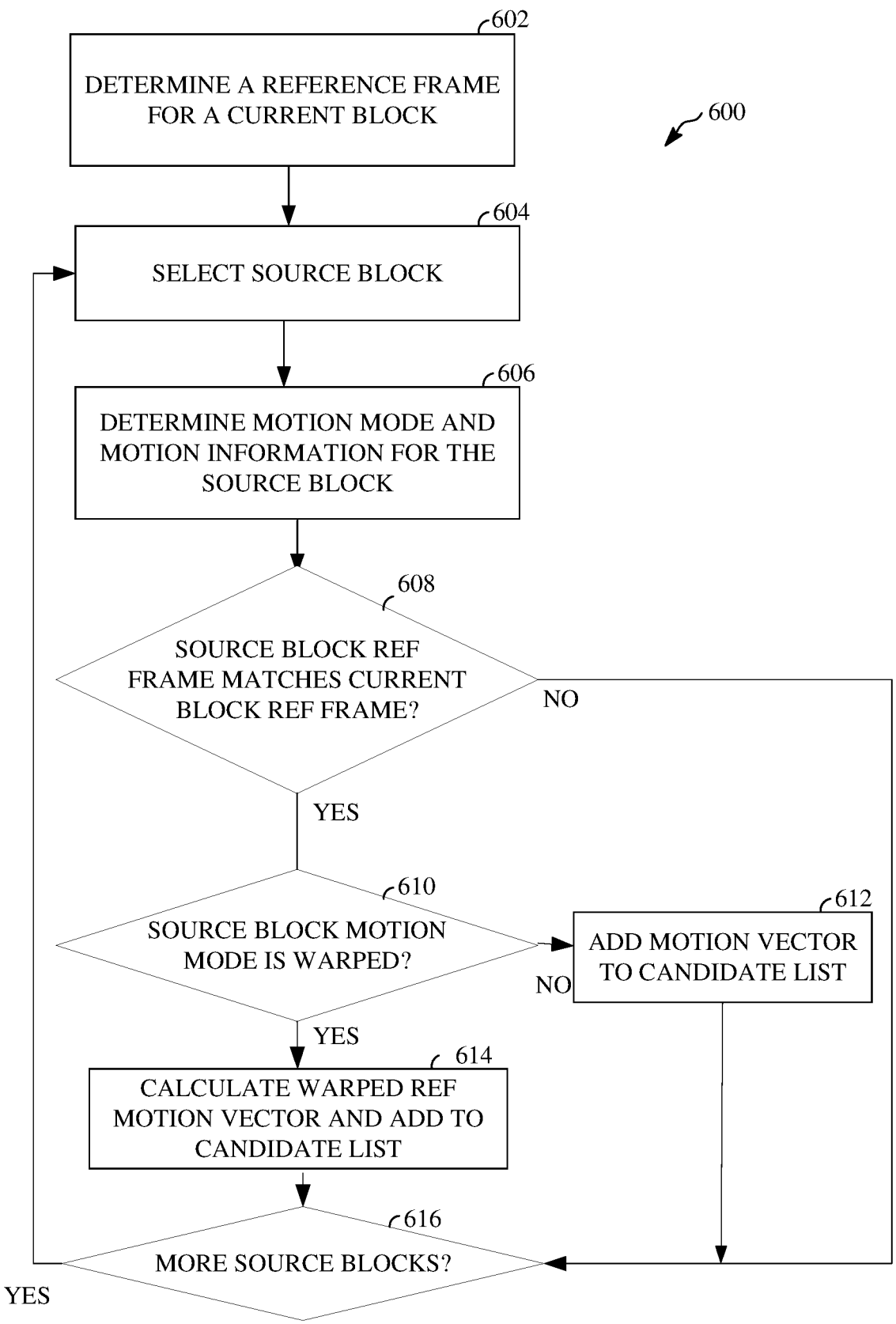
FIG. 6 is a flowchart diagram of a process for generating a warped reference motion vector.

FIG. 6 is a flowchart diagram of a method or process 600 for generating a reference motion vector for a block of a video frame. The process 600 can be implemented, for example, as a software program that may be executed by computing devices such as transmitting station 102 or receiving station 106. The software program can include machine-readable instructions that may be stored in a memory such as the memory 204 or the secondary storage 214, and that, when executed by a processor, such as CPU 202, may cause the computing device to perform the process 600. The process 600 may be implemented in whole or in part in the intra/inter prediction stage 402 of the encoder 400 and/or the intra/inter prediction stage 508 of the decoder 500. The process 600 can be implemented using specialized hardware or firmware. Multiple processors, memories, or both, may be used.

At operation 602, the process 600 determines a reference frame for a block, also referred to as the current block herein. Determining the reference frame for the current block may include selecting one reference frame of multiple available reference frames for predicting the current block. In some implementations, a reference frame buffer may store up to a defined number of available reference frames, such as four or eight reference frames. As one example, the reference frame buffer may store a LAST reference frame, corresponding to the last frame before the current frame in a video sequence, a GOLDEN reference frame, corresponding to an intra-predicted frame located before the current frame in the video sequence, and an alternate or alternative reference frame designated as ALTREF_FRAME. An alternative reference frame may be a frame of a video sequence that is distant from a current frame in a display order, but is encoded or decoded earlier than it is displayed. For example, the alternative reference frame may be ten, twelve, or more (or fewer) frames after the current frame in a display order of the video sequence. Further alternative reference frames can be frames located nearer to the current frame in the display order.

An alternative reference frame may not correspond directly to a frame in the sequence. Instead, the alternative reference frame may be generated using one or more frames having filtering applied, being combined together, or being both combined together and filtered. An alternative reference frame may not be displayed. Instead, it can be a frame or portion of a frame generated and transmitted for use only for prediction (i.e., it is omitted when the decoded sequence is displayed).

A reference frame buffer may be able to store additional or fewer reference frames. For example, the available spaces may store a second last frame (i.e., the first frame before the last frame) and/or a third last frame (i.e., a frame two frames before the last frame) as additional forward prediction reference frames (e.g., in addition to the LAST and GOLDEN reference frames). In some examples, a backward frame may be stored as an additional backward prediction reference frame (e.g., in addition to the ALTREF_FRAME reference frame). The terms LAST, GOLDEN, ALTREF_FRAME, etc., may be referred to as reference frame identifiers herein.

At operation 604, a source block is selected to determine a candidate reference motion vector. The source block may be a previously encoded neighboring block of the current block. When encoding occurs in raster scan order, the source block may be an adjacent block above, to the left of, above and to the left of, or above and to the right of the current block. The block above and to the left of the current block may also be referred to as an above-left block, while the block above and to the right of the current block may also be referred to as an above-right block. For example, in FIG. 7, a source block B for determining a candidate reference motion vector for the current block A is shown.

At operation 606, a motion mode and motion information are determined for the selected source block. The motion mode may be a translational motion mode or a warped motion mode. In the examples herein, a warped motion mode implementing an affine transformation motion model is described. However, the teachings herein may be used with any warped motion model. If the source block is intra-predicted, the process 600 ends. The motion information for the source block may include one or more motion vectors and an associated one or more reference frames. That is, if the selected source block is inter-predicted it has one or more motion vectors, each pointing to a respective reference frame. For this discussion, it is assumed that each source block uses only one motion vector for inter-prediction, but this is not necessary. Each motion vector and hence each reference frame of a source block may be processed as described herein.

At operation 608, a query is made as to whether the reference frame of the source block that is determined at operation 606 is the same as the reference frame for the current block determined at operation 602.

The comparison of reference frames at operation 608 may be performed by comparing reference frame identifiers. For example, if the source block reference frame is designated as the LAST reference frame, and the current block reference frame is designated as the LAST reference frame, then the reference frames may be considered as matching. On the other hand, the reference frame buffer is updated for each frame. For this reason, at least one of the LAST, GOLDEN, or ALTREF_FRAME reference frames may not correspond to the same frames for the previous frame as the current frame when considering a source block that is a co-located block. In this case, the identifiers LAST, GOLDEN, ALTREF_FRAME, or otherwise may be compared. Alternatively, the frames that are identified as the LAST, GOLDEN, ALTREF_FRAME, or other reference frame for each of the current block and the source block can be compared to determine whether they match at operation 608.

If the reference frames do not match in response to the query at operation 608, the process 600 advances to operation 616 to determine whether additional source blocks need to be considered. If instead the reference frames match, the process 600 advances to operation 610.

At operation 610, a query is made as to whether the motion mode for the source block is the warped motion mode. If the source block motion mode is a translational motion mode, the process 600 advances to operation 612. At operation 612, the motion vector of the source block is added to the candidate list before the process 600 advances to operation 616.

If instead the response to the query at operation 610 indicates that the source block motion mode is a warped motion mode, the process 600 advances to operation 614, where a warped reference motion vector is calculated and added to the candidate list. The calculation of a warped reference motion vector may be described with reference to FIG. 7.

Figure 7:
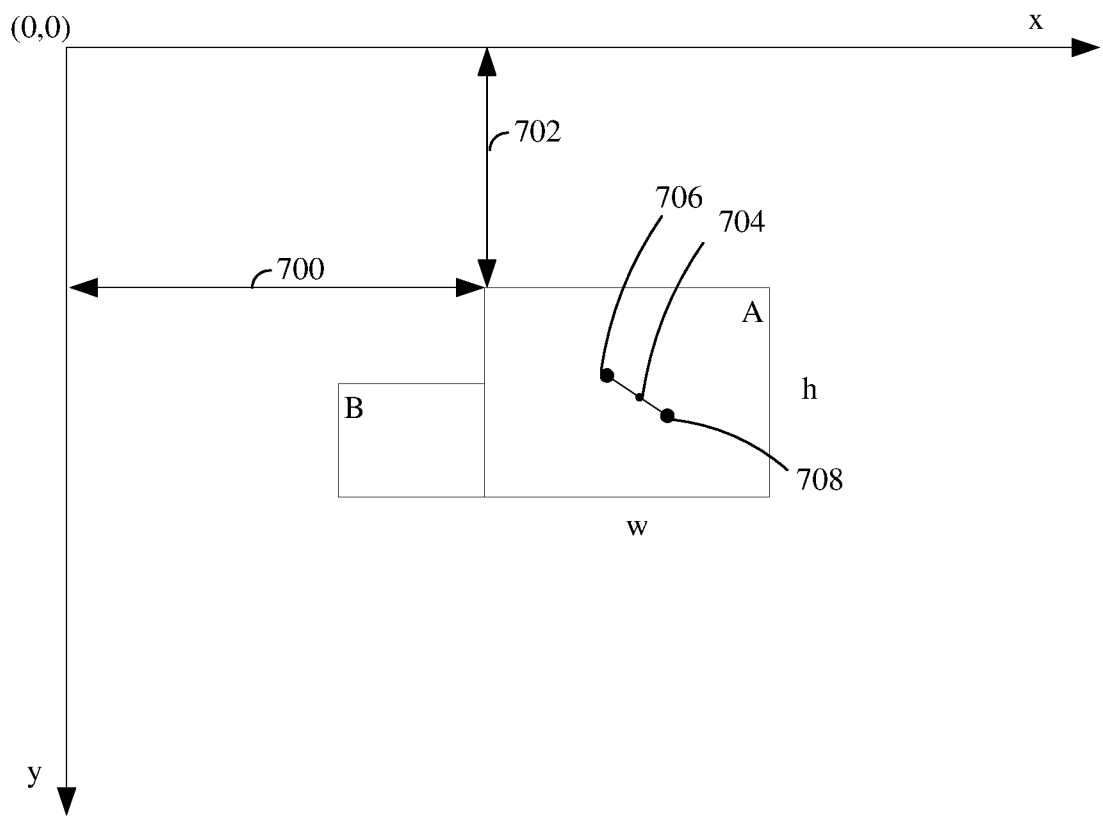
FIG. 7 is a diagram that illustrates the process of FIG. 6.

In the calculation of the warped reference motion vector, it is useful to assume that the motion vector of the block equals the motion vector of the center point of the block. In FIG. 7, the warped reference motion vector is calculated for the center point 704 of the current block A. The center point 704 may or may not correspond to a pixel location (e.g., it may be a whole pixel or a sub-pel pixel position). The source block B is predicted using a warped motion mode in this example. The warped motion model of the warped motion mode may be used to compute the motion vector of the center point 704 of the current block A. In this example, the warped motion model is an affine transformation. Thus, the affine parameters of the source block B may be used to compute the motion vector of the center point 704.

Desirably, several pixels near the center point 704 may be selected, and their motions calculated. It is useful, but not necessary that the pixels be evenly spaced from the center point 704. The pixels may be spaced on opposite sides of the center point 704. Once their motions are calculated, the center point motion vector, and hence the warped reference motion vector may be determined by interpolation.

In FIG. 7, two pixels 706 and 708 are selected. The pixel 706 has a pixel position or location of (x0, y0), and the pixel 706 has a pixel position or location of (x1, y1). Their coordinates relative to the frame origin (0,0) are $x_0$=block_offset_$x$+$w$/2−1;

$y_0$=block_offset_$y$+$h$/2−1;

$x_1$=block_offset_$x$+$w$/2; and $y_1$=block_offset_$y$+$h$/2.

In this determination, (block_offset_x, block_offset_y) is the coordinate of the top-left pixel of the current block A as shown by the arrows 700 and 702, respectively, w is the width of the current block A, and h is the height of the current block A. For example, where the current block size is 8×8, and ignoring (block_offset_x, block_offset_y), the center point is at (3.5, 3.5), which is not a full pixel location. The above formulas pick two pixels that have equal distance to the center point, so that motion vector interpolation in a later stage (described below) may be performed by simply averaging the two. Here, for example, (x0, y0)=(8/2−1, 8/2−1) and (x1, y1)=(8/2, 8/2), namely (3, 3) and (4, 4). This is a simplified example. In general, different points could be used, and an adjustment could be made correspondingly during the interpolation stage.

The affine projections of each of the two pixels 706 and 708 may be calculated according to $$x'_i = a*x_i + b*y_i + c; \text{ and}$$

$$y'_i = d*x_i + e*y_i + f$$

Here, i=0 and 1 (for the respective pixels 706 and 708), and a, b, c, d, e, and f are the affine parameters of the source block B.

Then, the corresponding motion vector for each of the pixels 706 and 708 is calculated according to $$\{MV\_x_i, MV\_y_i\} = \{x'_i - x_i, y'_i - y_i\} \quad (1)$$

where i=0 and 1 (for the respective pixels 706 and 708).

Finally, the warped reference motion vector may be obtained by bilinear interpolation according to $$\text{warped\_reference\_MV} = \{(MV\_x_0 + MV\_x_1)/2, (MV\_y_0 + MV\_y_1)/2\}.$$

At operation 614, warped_reference_MV is added to the candidate motion vector list for the current block A.

These operations are useful where the center point does not correspond to a pixel location. If the center point does correspond to a pixel location, no interpolation is needed. That is, the motion vector at the pixel location corresponding at the center point using above equations except that the equations are performed using only the pixel at the center location, and the motion vector resulting from equation (1) is warped_reference_MV that is added directly to the candidate motion vector list.

Referring again to FIG. 6, whether a motion vector of the source block is directly added to the candidate list at operation 612 or a warped reference motion vector of the source block is added to the candidate list at operation 614, the process advances to operation 616 to query whether there are more source blocks to consider. If there are more source blocks to consider, the process 600 returns to operation 604 so that the process 600 is repeated for the next source block. If there are no more source blocks to consider in response to the query at operation 616, the process 600 ends. The candidate list is complete for the reference frame determined at operation 602.

After all of the source blocks are considered in the process 600, a motion search for the current block in the reference frame determined at operation 602 (which also may be referred to as the current reference frame herein) may be performed. The process 600 may be repeated for some or all of the available reference frames such that each of the reference frames determined at operation 602 has a respective candidate list of reference motion vectors. For example, the process 600 may be performed as part of a rate-distortion loop to select the best prediction mode for the blocks of a current frame. As part of the rate-distortion loop, different intra-prediction modes may also be considered, along with prediction using the different reference frames.

After the process 600 ends for the current block, whether or not multiple reference frames are processed, the candidate list for the reference frame may be ranked as discussed previously, and used to select the motion vector coding mode (e.g., ZEROMV mode, NEWMV mode, or REFMV mode) as whichever of the motion vector coding modes results in the lowest, e.g., rate-distortion, error for coding the motion vector.

The teachings herein may be used for a compound prediction mode that has two or more motion vectors referring to respective reference frames, as well as for single predictors as described in detail above. Where the current block is encoded using two motion vectors, for example, different reference motion vectors may be used in the determination of the motion vector coding mode from respective reference frame candidate lists.

A decoder can use the same process as the encoder to complete the candidate list and find the reference motion vector used to code the motion vector for the current block. In the decoder, determining the reference frame for the block at the operation 602 may include reading header information from a block header, a slice header, a frame header, or any combination of these headers that identifies the reference frame for the current block. The remainder of the operations of the process 600 are performed as previously described for the one or more reference frames used to encode the current block. Once a candidate list is complete, it may be used to decode the motion vector as indicated by the motion vector coding mode that may be read from a header, such as a block header, a slice header, a frame header, or any combination of these headers.

In encoding of the current block, reductions in computational resources and complexity may be achieved by re-using warped motion model information (e.g., affine parameters) for the block. For example, the affine parameters for a current block may be obtained by a parameter search or be estimated based on motion vectors of nearby blocks. If one area in a frame obeys an affine transformation, then two blocks within that area may use a same set of affine parameters. Accordingly, if a source block (such as the neighbor block B) uses the same reference frame as the current block A, the current block A and the source block B both use a warped motion mode, and the current block A uses REFMV mode, it is possible to assign the affine parameters of the source block B to the current block A. This would not hurt coding efficiency, but such a step can speed up the encoder and decoder by not searching or estimating the affine parameters for the current block A.

The proposed warped reference motion vector strategy can provide a more accurate reference motion vector for the current block than directly using a source block motion vector when the source block exhibits warped motion. As mentioned above, without the present teachings, a block is very likely to choose the NEWMV mode under such circumstances. Using the teachings herein, an encoder exhibits increased use of the REFMV mode. This shows that the teachings herein provide more accurate reference motion vectors and lower the bitrate cost. For a set of videos with camera motions, a 0.5%~1+% bitrate reduction has been demonstrated.

For simplicity of explanation, the process 600 is depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms and/or instructions described herein. In addition, or alternatively, for example, a special purpose computer/processor can be utilized that contains other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server and the receiving station 106 can be implemented on a device separate from the server, such as a hand-held communications device. In this instance, the transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method, comprising:
   determining a reference frame for a current block;
   for each source block of the current block:
      determining a motion mode and motion information for the source block;
      responsive to determining that the motion mode for the source block is a translational motion mode and that a reference frame for the source block matches the reference frame for the current block:
         identifying a first motion vector used to predict the source block; and
         adding the first motion vector to a reference motion vector candidate list; and
      responsive to determining that the motion mode for the source block is a warped motion mode and that the reference frame for the source block matches the reference frame for the current block:
         generating a warped reference motion vector for the current block; and
         adding the warped reference motion vector to the reference motion vector candidate list; and
   using a reference motion vector from the reference motion vector candidate list to encode or decode a motion vector used to predict the current block.

2. The method of claim 1, wherein the source block comprises a previously-encoded block adjacent to the current block.

3. The method of claim 1, wherein generating the warped reference motion vector comprises:
   selecting pixels spaced from a center of the current block;
   determining a motion vector for each of the pixels using parameters of the warped motion mode used to encode the source block; and
   combining the motion vectors for the pixels to generate the warped reference motion vector.

4. The method of claim 3, wherein combining the motion vectors comprises performing interpolation using the motion vectors of the pixels as input.

5. The method of claim 4, wherein the interpolation is bilinear interpolation.

6. The method of claim 3, wherein the warped motion mode implements a non-translational transformation, and the parameters of the warped motion mode comprise non-translational parameters of the source block.

7. The method of claim 3, wherein the warped motion mode implements an affine transformation, and the parameters of the warped motion mode comprise affine parameters of the source block.

8. The method of claim 3, wherein the pixels comprise one or multiple pixels nearest to the center of the current block.

9. The method of claim 3, wherein the pixels comprise two pixels equidistantly nearest to the center of the current block.

10. The method of claim 1, wherein the warped motion mode implements a non-translational transformation.

11. The method of claim 10, wherein the non-translational transformation is an affine transformation.

12. An apparatus, comprising:
    a processor; and
    a non-transitory storage medium that includes instructions executable by the processor to carry out a method comprising:
       determining a reference frame for a current block;
       for each source block for the current block:
          determining a motion mode and motion information for the source block;
          responsive to determining that the motion mode for the source block is a translational motion mode and that a reference frame for the source block matches the reference frame for the current block:
             identifying a first motion vector used to predict the source block; and
             adding the first motion vector to a reference motion vector candidate list;
          responsive to determining that the motion mode for the source block is the warped motion mode and that the reference frame for the source block matches the reference frame for the current block:
             generating a warped reference motion vector for the current block; and
             adding the warped reference motion vector to the reference motion vector candidate list; and
       using a reference motion vector from the reference motion vector candidate list to encode or decode a motion vector used to predict the current block.

13. The apparatus of claim 12, wherein:
    determining the reference frame for the current block comprises reading an identifier of the reference frame from an encoded bitstream.

14. The apparatus of claim 12, wherein source blocks of the current block comprise a co-located block to the current block.

15. The apparatus of claim 12, wherein the warped motion mode implements an affine transformation; and generating the warped reference motion vector for the current block comprises:
    selecting two pixels equidistantly-spaced nearest to a center of the current block;
    determining a motion vector for each of the pixels using affine parameters used to encode the source block; and
    combining the motion vectors using bi-linear interpolation to generate the warped reference motion vector.

16. An apparatus, comprising:
a processor; and
a non-transitory storage medium that includes instructions executable by the processor to carry out a method comprising:
   determining a reference frame for coding a current block;
   for a previously-coded block adjacent to the current block:
      determining a motion mode of the previously-coded block, the motion mode comprising one of a translational motion mode or a warped motion mode;
      determining a reference frame used to encode the previously-coded block;
      comparing the motion mode of the previously-coded block to the warped motion mode to obtain a first comparison result;
      comparing the reference frame for coding the current block to the reference frame used to encode the previously-coded block to obtain a second comparison result; and
      responsive to the first comparison result indicating that the motion mode of the previously-coded block is the warped motion mode, and the second comparison result indicating that the reference frame for coding the current block is the reference frame used to encode the previously-coded block:
         calculating a warped reference motion vector for the current block by applying a warped motion model used to predict the previously-coded block to pixels of the current block; and
         adding the warped reference motion vector to a reference motion vector candidate list; and
   using a reference motion vector from the reference motion vector candidate list to encode or decode a motion vector used to predict the current block.

17. The apparatus of claim 16, wherein the method further comprises:
   responsive to the first comparison result indicating that the motion mode of the previously-coded block is other than the warped motion mode, and the second comparison result indicating that the reference frame for coding the current block is the reference frame used to encode the previously-coded block, adding a motion vector used to predict the previously-coded block to the reference motion vector candidate list.

18. The apparatus of claim 16, wherein the method further comprises:
   responsive to the second comparison result indicating that the reference frame for coding the current block is other than a reference frame used to encode the previously-coded block, omitting a motion vector used to predict the previously-coded block from the reference motion vector candidate list.

19. The apparatus of claim 16, wherein the warped motion model comprises an affine transformation, the first comparison result indicates that the motion mode of the previously-coded block is the warped motion mode, the motion mode of the current block is the warped motion mode, using the reference motion vector comprises adding the reference motion vector to a motion vector residual decoded from an encoded bitstream to generate the motion vector to predict the current block, and affine parameters of the previously-coded block are re-used to predict the current block.

20. The apparatus of claim 16, wherein the current block is encoded using the warped motion mode.

\* \* \* \* \*